United States Patent
Salam et al.

(10) Patent No.: US 9,156,021 B2
(45) Date of Patent: Oct. 13, 2015

(54) METHOD AND NANOCOMPOSITE FOR TREATING WASTEWATER

(71) Applicant: KING ABDULAZIZ UNIVERSITY, Jeddah (SA)

(72) Inventors: Mohamed Abdel Salam, Jeddah (SA); Mohamed A. Gabal, Jeddah (SA); Abdullah Y. Obaid, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 410 days.

(21) Appl. No.: 13/730,571

(22) Filed: Dec. 28, 2012

(65) Prior Publication Data

US 2014/0183138 A1 Jul. 3, 2014

(51) Int. Cl.
| | |
|---|---|
| *B01J 20/28* | (2006.01) |
| *B01J 20/30* | (2006.01) |
| *B01J 20/06* | (2006.01) |
| *B01J 20/02* | (2006.01) |
| *B01J 20/20* | (2006.01) |
| *C02F 1/28* | (2006.01) |
| *C02F 1/48* | (2006.01) |
| *C02F 101/38* | (2006.01) |

(52) U.S. Cl.
CPC ........ *B01J 20/28009* (2013.01); *B01J 20/0225* (2013.01); *B01J 20/0229* (2013.01); *B01J 20/06* (2013.01); *B01J 20/205* (2013.01); *B01J 20/3078* (2013.01); *C02F 1/283* (2013.01); *B01J 2220/42* (2013.01); *C02F 1/488* (2013.01); *C02F 2101/38* (2013.01); *C02F 2305/08* (2013.01)

(58) Field of Classification Search
CPC .... B01J 20/2809; B01J 20/3078; B01J 20/06; B01J 20/0225; B01J 20/205; B01J 2220/42; C02F 1/283; C02F 1/488; C02F 2305/08
See application file for complete search history.

(56) References Cited

U.S. PATENT DOCUMENTS

| 7,074,336 B1 | 7/2006 | Teter et al. | |
|---|---|---|---|
| 7,504,130 B1 | 3/2009 | Misra | |
| 2010/0059448 A1* | 3/2010 | Fujieda et al. | 210/695 |
| 2010/0233812 A1 | 9/2010 | Sun et al. | |

FOREIGN PATENT DOCUMENTS

| CN | 101264946 A | 9/2008 |
|---|---|---|
| WO | WO 2010/062586 A2 | 6/2010 |

* cited by examiner

*Primary Examiner* — David A Reifsnyder
(74) *Attorney, Agent, or Firm* — Richard C Litman (57) ABSTRACT

The method and nanocomposite for treating wastewater provides a method of treating aniline-containing wastewater with a magnetic nanocomposite. Nickel nitrate, iron nitrate and citric acid are dissolved in deionized water to form a metal nitrate and citric acid solution, which is then pH balanced. The pH balanced solution is then heated to form a gel, which is then ignited to form powdered $NiFe_2O_4$. Nanoparticles of the powdered $NiFe_2O_4$ combustion product are then mixed with multi-walled carbon nanotubes to form a magnetic nanocomposite, such that the magnetic nanocomposite includes approximately 75 wt % of the multi-walled carbon nanotubes and approximately 25 wt % of the $NiFe_2O_4$. The magnetic nanocomposite may then be mixed into a volume of aniline-containing wastewater for adsorption of the aniline by the nanocomposite. A magnetic field is then applied to the mixture to magnetically separate the magnetic nanocomposite and the adsorbed aniline from the wastewater.

6 Claims, 8 Drawing Sheets

METHOD AND NANOCOMPOSITE FOR TREATING WASTEWATER

BACKGROUND OF THE INVENTION

1. Field of the Invention

The present invention relates to compositions for treating wastewater, and particularly to a method and nanocomposite for treating wastewater, the nanocomposite being a mixture of multi-wall carbon nanotubes and ferrite nanoparticles.

2. Description of the Related Art

Due to a wide variety of manufacturing processes, contaminated wastewater has become a great concern, not only to the environment, but as a potential toxin for both human and animal life which may be exposed to the wastewater. Aniline is a particularly toxic byproduct often found in wastewater. Aniline-containing wastewater is presently treated using photo-decomposition, electrolysis, adsorption, oxidation, biodegradation, and combinations of these processes. Each, however, is relatively inefficient and is costly, both in terms of resources and financial costs.

There is great interest in the use of multi-walled carbon nanotubes for the removal of pollutants from water. However, the formation of multi-walled carbon nanotubes composites can be difficult, and the removal thereof from the water being treated is also quite difficult. Magnetic separation is an efficient process for the removal of nanocomposites from water, as well as pollutants seeded with a magnetic material such as magnetite ($Fe_3O_4$), using a high gradient magnetic separator. Thus, it would be desirable to provide a nanocomposite with magnetic properties, and which also efficiently adsorbs organic matter, such as aniline, from wastewater.

Thus, a method and nanocomposite for treating wastewater solving the aforementioned problems is desired.

SUMMARY OF THE INVENTION

The method and nanocomposite for treating wastewater relates to a method of treating wastewater containing organic matter with a magnetic nanocomposite and a method of making the magnetic nanocomposite. In order to make the magnetic nanocomposite, nickel nitrate, iron nitrate and citric acid are dissolved in deionized water to form a metal nitrate and citric acid solution. An ammonia solution is selectively added to the nitrate and citric acid solution to form a pH balanced solution having a pH of 7.0. The pH balanced solution is then heated to form a gel, which is dried and then ignited to form a powdered $NiFe_2O_4$ combustion product. The powdered $NiFe_2O_4$ combustion product is then mixed with multi-walled carbon nanotubes to form a magnetic nanocomposite, such that the magnetic nanocomposite includes approximately 75 wt % of the multi-walled carbon nanotubes and approximately 25 wt % of the $NiFe_2O_4$.

The magnetic nanocomposite may then be mixed into a volume of aniline-containing wastewater for adsorption of the aniline by the nanocomposite. A magnetic field is then applied to the mixture to magnetically separate the magnetic nanocomposite and the adsorbed aniline from the wastewater, and the magnetic nanocomposite and the adsorbed aniline may then be easily removed from the wastewater.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method and nanocomposite for treating wastewater relates to a method of treating aniline-containing wastewater with a magnetic nanocomposite, to the nanocomposite, and to a method of making the magnetic nanocomposite. The nanocomposite includes nanoparticles of magnetite ($NiFe_2O_4$), which are made by a sol gel process. In order to make the magnetic nanocomposite, nickel nitrate [$Ni(NO_3)_2 \cdot 6H_2O$], iron nitrate [$Fe(NO_3)_2 \cdot 9H_2O$] and citric acid ($C_6H_8O_7 \cdot H_2O$) are dissolved in deionized water to form a metal nitrate and citric acid solution. The metal nitrates and the citric acid are provided in a 1:1 molar ratio.

Figure 1:
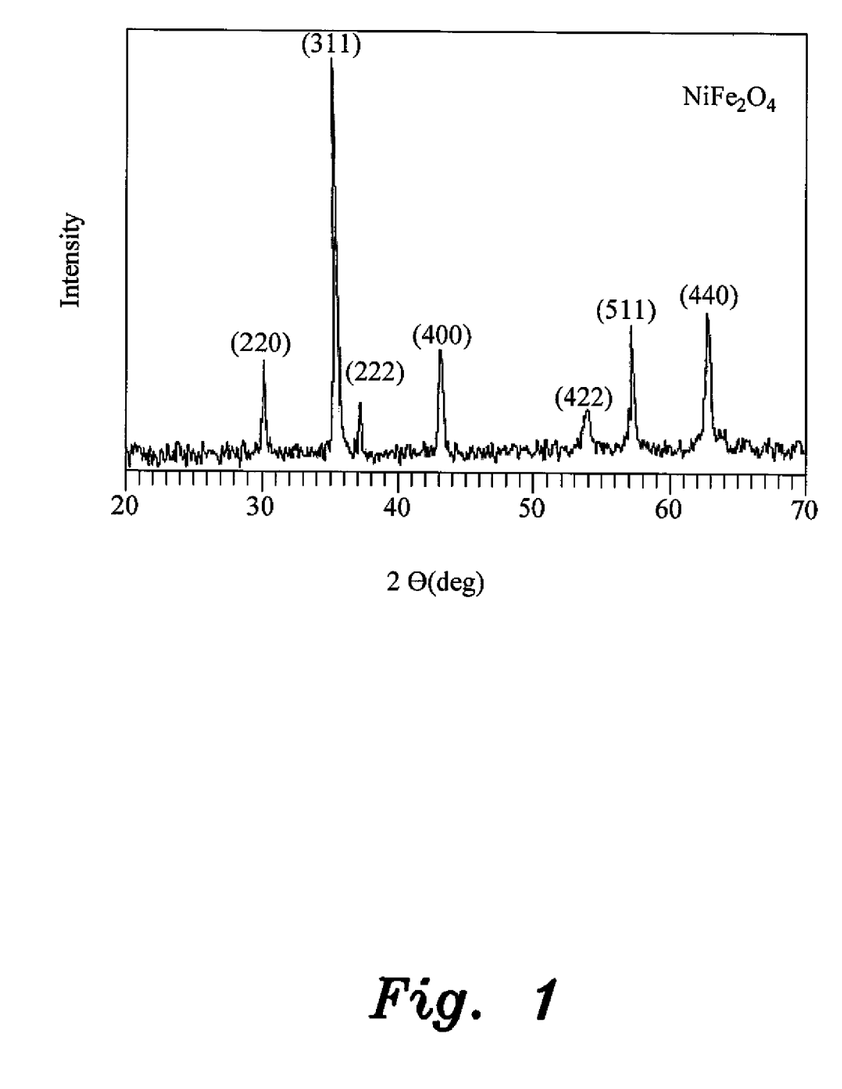
FIG. 1 is an X-ray diffraction plot of a $NiFe_2O_4$ precursor of a nanocomposite for treating wastewater according to the present invention.
Figure 2:
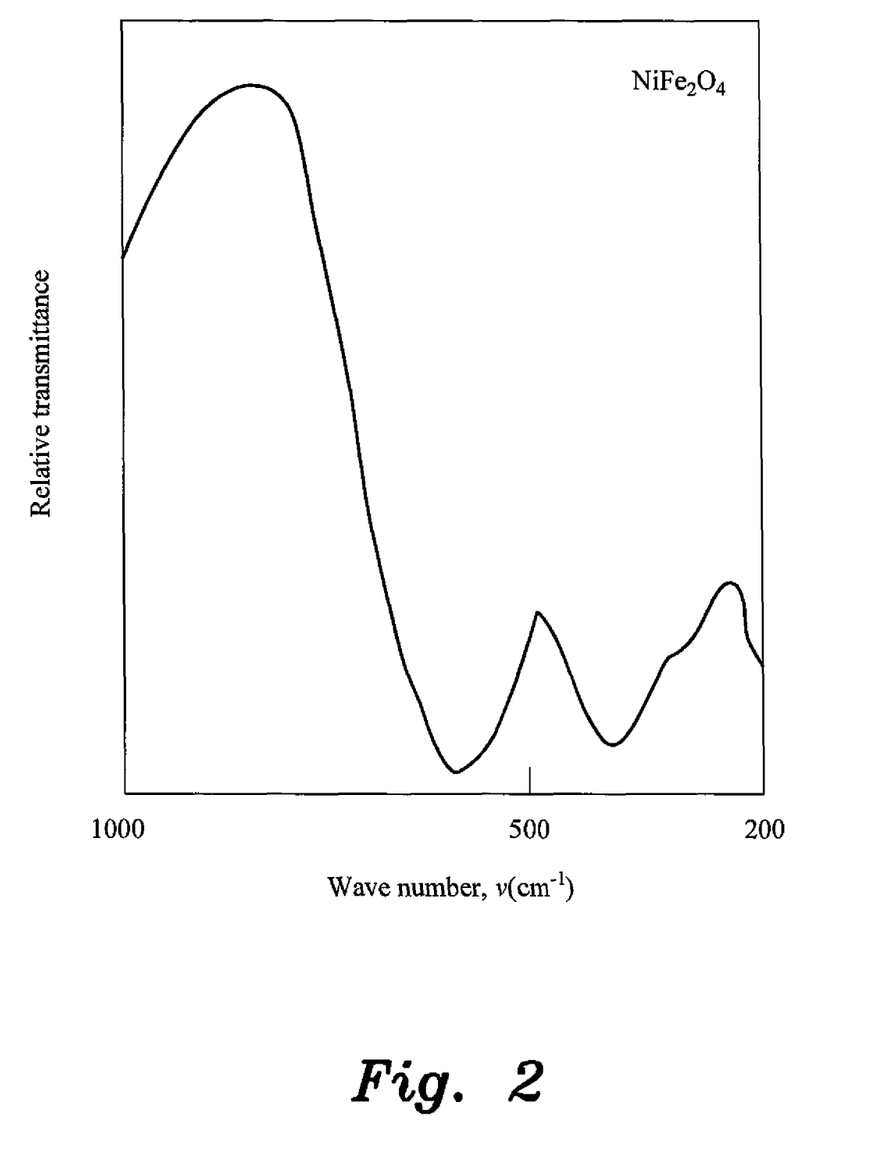
FIG. 2 is a Fourier transform infrared spectroscopy transmittance graph of the $NiFe_2O_4$ precursor of FIG. 1.

An ammonia solution is selectively added to the metal nitrate and citric acid solution to form a pH balanced solution having a pH of 7.0. The pH balanced solution is then heated at a temperature of approximately 80° C. to form a gel, which is dried and then ignited to form a powdered $NiFe_2O_4$ combustion product. When the dried gel is ignited at any point, the combustion rapidly propagates forward and is left to completely combust, forming a loose powder of nanoparticle size. Preferably, complete ignition is performed in a muffle furnace at a temperature of approximately 700° C. Complete combustion is found to take approximately two hours. FIG. 1 is an X-ray diffraction plot of the prepared $NiFe_2O_4$. FIG. 2 illustrates the relative transmittance of the $NiFe_2O_4$ via Fourier transform infrared spectroscopy (FTIR).

The powdered $NiFe_2O_4$ combustion product is then thoroughly mixed with multi-walled carbon nanotubes to form a magnetic nanocomposite, such that the magnetic nanocomposite is a homogenous mixture including approximately 75 wt % of the multi-walled carbon nanotubes and approximately 25 wt % of the $NiFe_2O_4$.

The magnetic nanocomposite may then be mixed into a volume of aniline-containing wastewater for adsorption of the aniline by the magnetic nanocomposite. A magnetic field is then applied to the mixture to magnetically separate the magnetic nanocomposite and the adsorbed aniline from the wastewater, and the magnetic nanocomposite and the adsorbed aniline may then be easily removed from the wastewater.

The $NiFe_2O_4$ on its own has a saturation magnetization of 30.2 EMU per gram, a remanent magnetization of 11.70 EMU per gram, and a magnetic coercivity of 162 Oe (measured by a vibrating sample magnetometer). The multi-walled carbon nanotubes, on their own, have a saturation magnetization of 0.1 EMU per gram, a remanent magnetization of 0.04 EMU per gram, and a magnetic coercivity of 68 Oe. The mixed nanocomposite has a saturation magnetization of 3.2 EMU per gram, a remanent magnetization of 1.15 EMU per gram, and a magnetic coercivity of 164 Oe.

Figure 3:
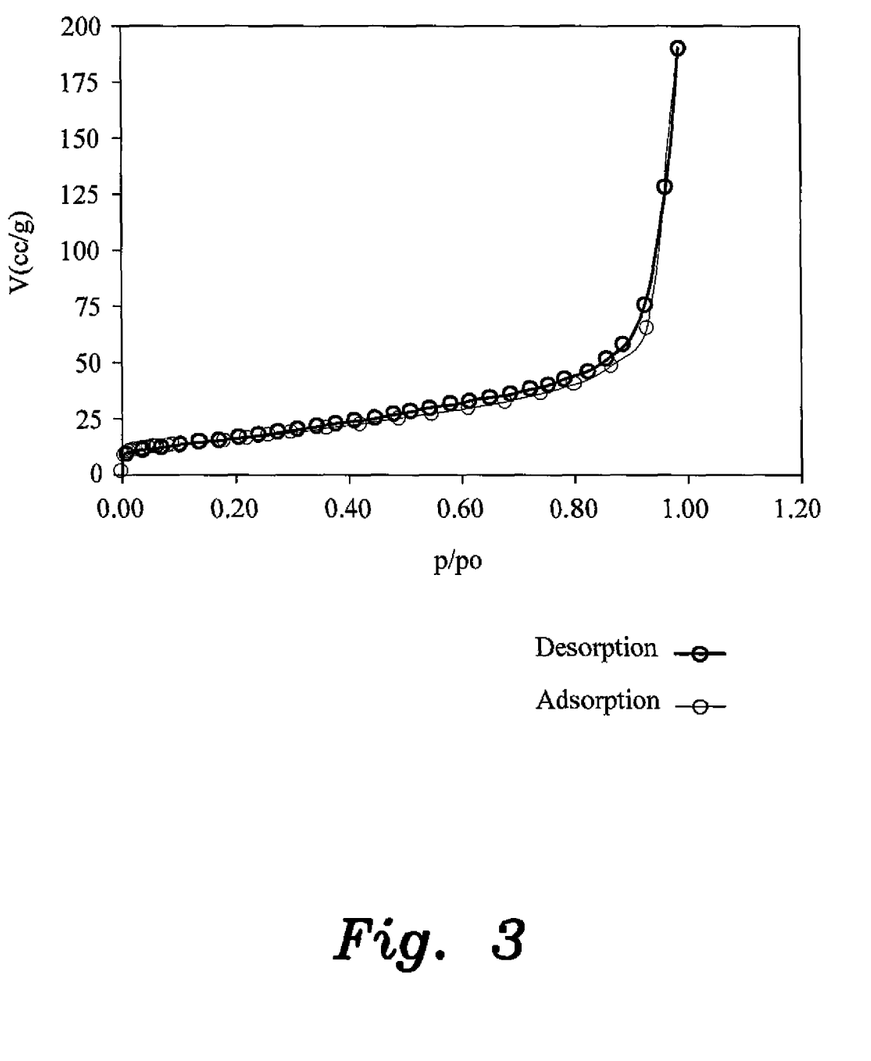
FIG. 3 illustrates a surface area analysis for the nanocomposite for treating wastewater according to the present invention.
Figure 4:
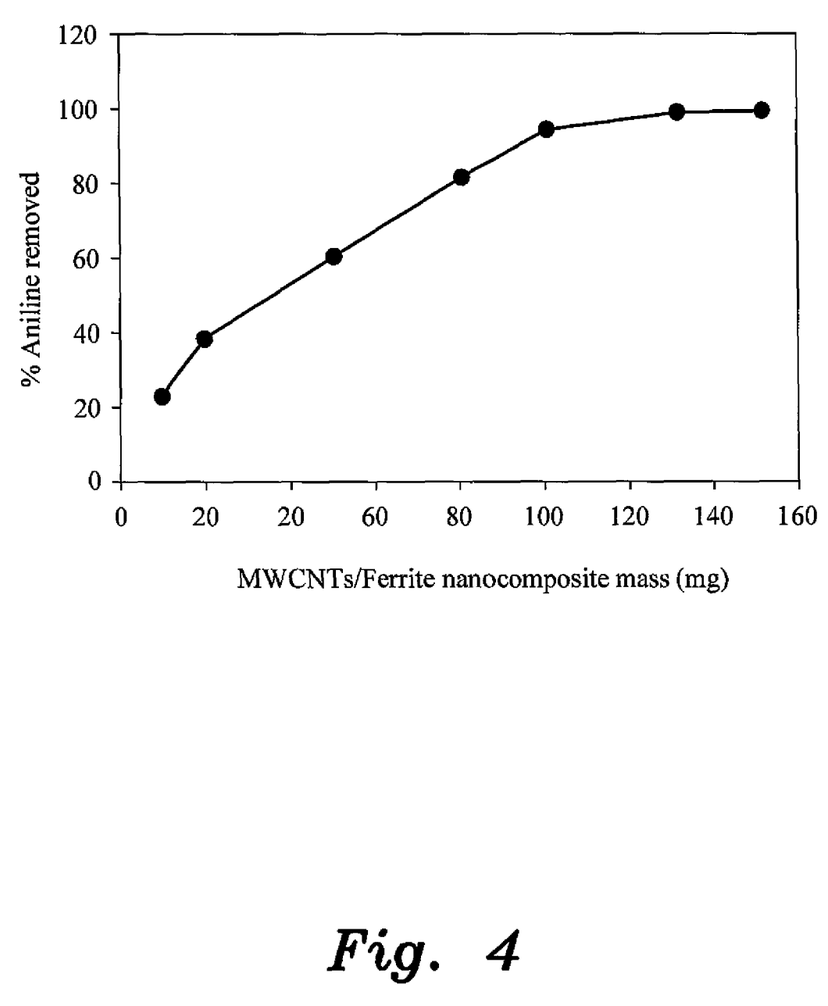
FIG. 4 is a graph illustrating aniline removal from wastewater as a function of added magnetic nanocomposite mass in a method for treating wastewater according to the present invention.
Figure 5:
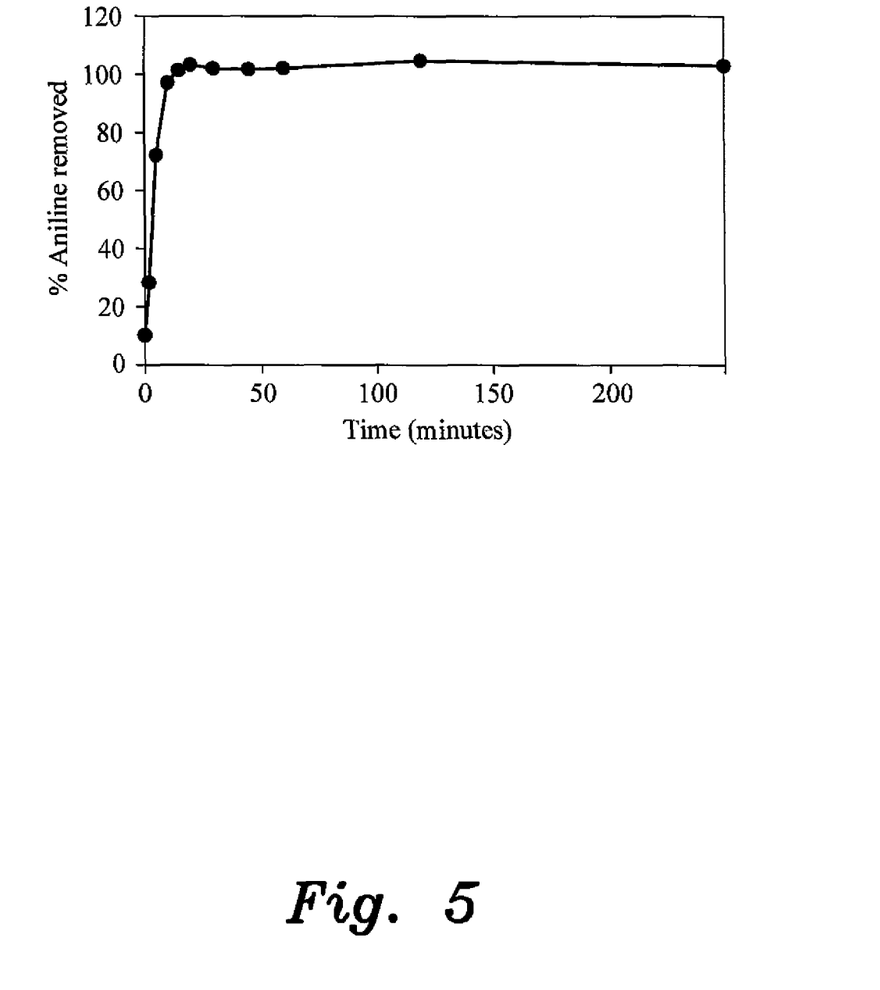
FIG. 5 is a graph illustrating aniline removal from wastewater by the magnetic nanocomposite as a function of exposure time in a method for treating wastewater according to the present invention.
Figure 6:
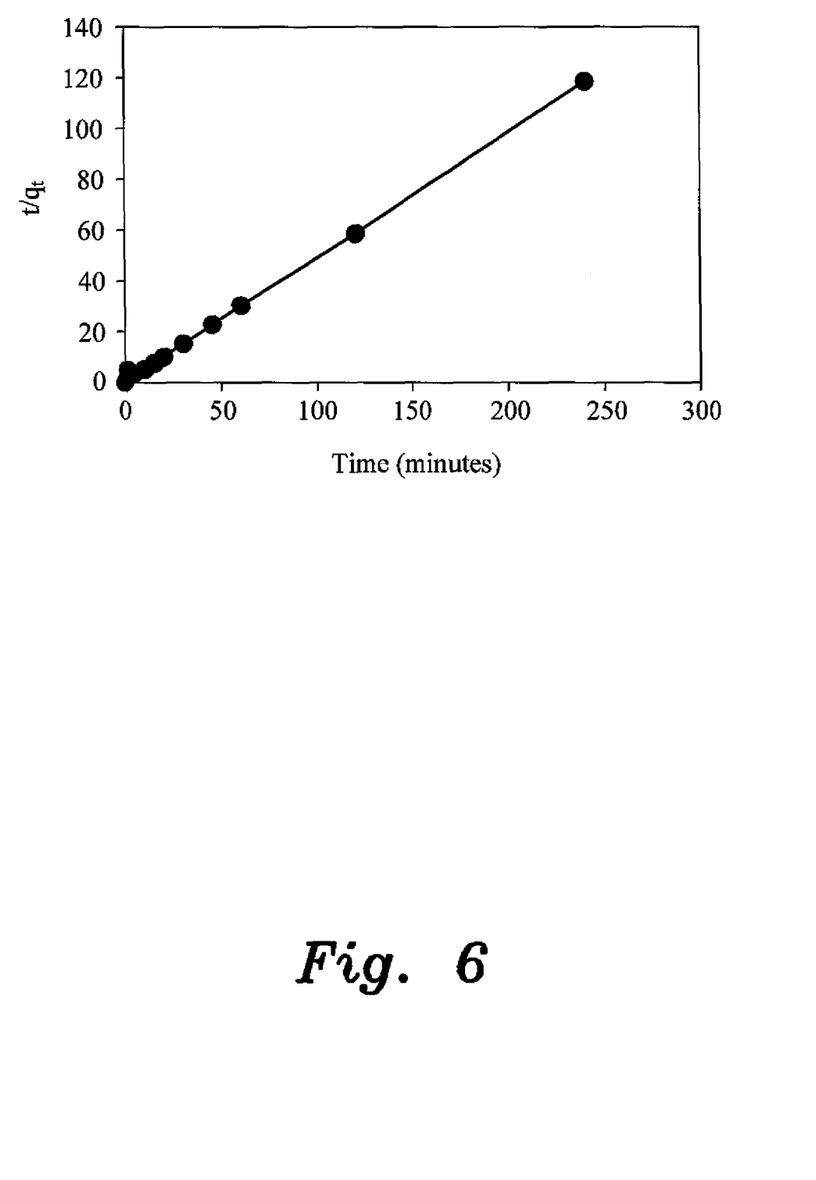
FIG. 6 is a pseudo-second-order plot illustrating the adsorption of the aniline by the magnetic nanocomposite as a function of time in a method for treating wastewater according to the present invention.
Figure 7:
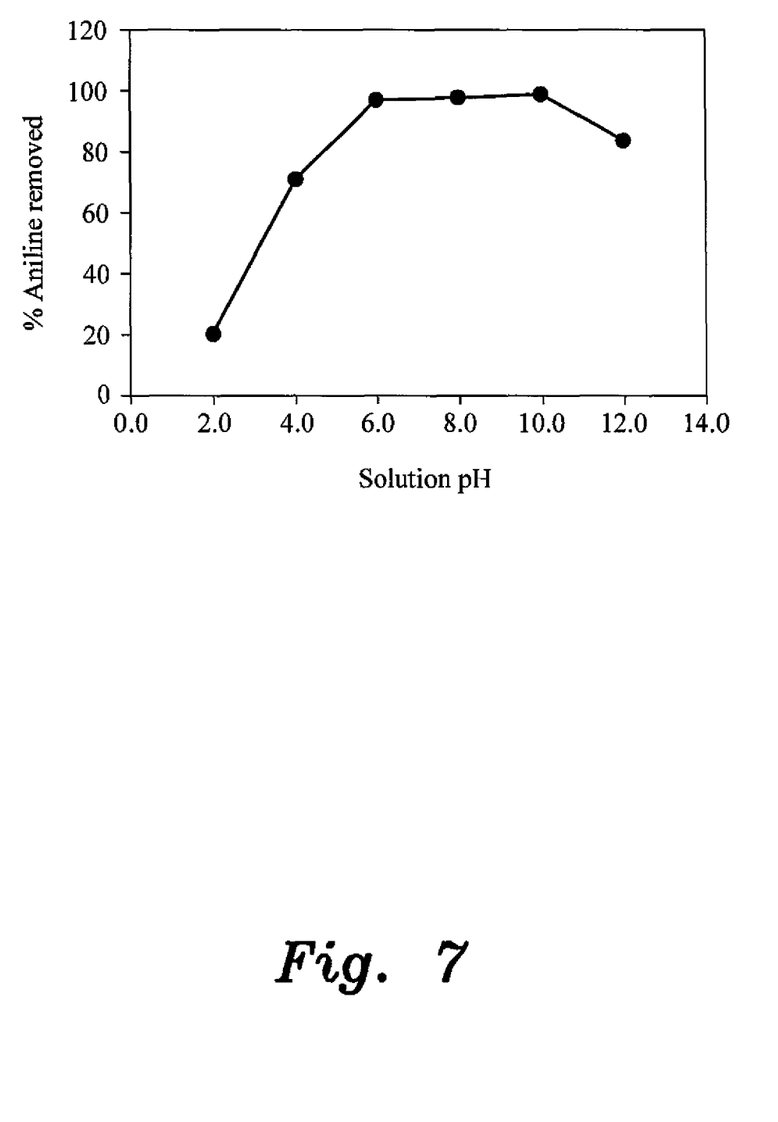
FIG. 7 is a graph illustrating aniline removal from the wastewater by the magnetic nanocomposite as a function of solution pH in a method for treating wastewater according to the present invention.
Figure 8:
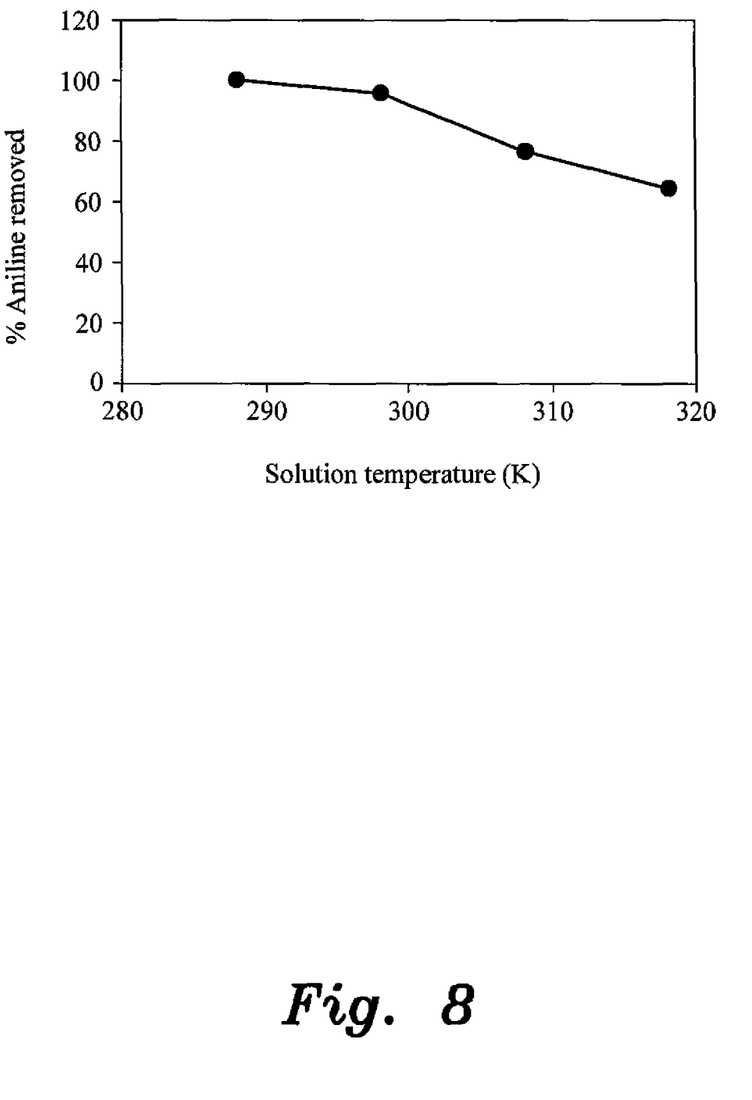
FIG. 8 is a graph illustrating aniline removal from the wastewater by the magnetic nanocomposite as a function of solution temperature in a method for treating wastewater according to the present invention.

FIG. 3 illustrates a surface area analysis for the mixed magnetic nanocomposite, and FIG. 4 illustrates the effect of the mixed magnetic nanocomposite mass on the aniline removal from the wastewater. FIG. 5 shows the effect of contact time on the removal of aniline from the wastewater, showing that most of the aniline is removed after only approximately 20 minutes of exposure. FIG. 6 is a pseudo-second-order plot illustrating the adsorption of the aniline by the magnetic nanocomposite as a function of time. FIG. 7 shows the effect of solution pH on the removal of aniline from the wastewater by the magnetic nanocomposite. FIG. 8 illustrates the effectiveness of aniline removal from the wastewater as a function of temperature.

It is to be understood that the present invention is not limited to the embodiments described above, but encompasses any and all embodiments within the scope of the following claims.

We claim:

1. A method of making a magnetic nanocomposite, comprising the steps of:
    dissolving nickel nitrate, iron nitrate and citric acid in deionized water to form a metal nitrate and citric acid solution;
    selectively adding an ammonia solution to the metal nitrate and citric acid solution to form a pH balanced solution having a pH of 7.0;
    heating the pH balanced solution to form a gel;
    igniting the gel to form a powdered $NiFe_2O_4$ combustion product of nanoparticle size; and
    mixing the powdered $NiFe_2O_4$ combustion product with multi-walled carbon nanotubes to form a magnetic nanocomposite having about 75 wt % of the multi-walled carbon nanotubes and about 25 wt % of the $NiFe_2O_4$.

2. The method of making a magnetic nanocomposite as recited in claim 1, wherein said step of dissolving the nickel nitrate, the iron nitrate and the citric acid in the deionized water comprises dissolving the metal nitrates and the citric acid in a molar ratio of 1:1 in the deionized water.

3. The method of making a magnetic nanocomposite as recited in claim 2, wherein said step of heating the pH balanced solution comprises heating the pH balanced solution at a temperature of about 80° C.

4. The method of making a magnetic nanocomposite as recited in claim 3, wherein said step of igniting the gel to form the powdered $NiFe_2O_4$ combustion product comprises complete ignition of the gel in a furnace at a temperature of about 700° C. for a time period of about two hours.

5. A method of treating aniline-containing wastewater with a magnetic nanocomposite, comprising the steps of:
    mixing a magnetic nanocomposite into aniline-containing wastewater, the magnetic nanocomposite being about 75 wt % of multi-walled carbon nanotubes and about 25 wt % nanoparticles of $NiFe_2O_4$, whereby said magnetic nanocomposite adsorbs aniline from the aniline-containing wastewater;
    applying a magnetic field to the mixture to magnetically separate the magnetic nanocomposite and the adsorbed aniline from the wastewater; and
    removing the magnetic nanocomposite and the adsorbed aniline from the wastewater.

6. A nanocomposite for treating wastewater, consisting of a homogenous mixture containing about 75 wt % of multi-walled carbon nanotubes and about 25 wt % nanoparticles of $NiFe_2O_4$.

* * * * *